United States Patent
Biendl et al.

(10) Patent No.: US 6,867,332 B1
(45) Date of Patent: Mar. 15, 2005

(54) PROCESS FOR PRODUCING XANTHOHUMOL PRESENT IN HOPS AND XANTHOHUMOL-RICH HOP EXTRACT OBTAINABLE THEREBY

(75) Inventors: Martin Biendl, Elsendorf (DE); Hans Becker, St. Ingbert (DE); Aslieh Nookandeh, Saarbrücken (DE)

(73) Assignee: Hallertauer Hopfenveredelungsgesellschaft m.b.H., Mainburg (DE)

( * ) Notice: Subject to any disclaimer, the term of this patent is extended or adjusted under 35 U.S.C. 154(b) by 0 days.

(21) Appl. No.: 10/624,493

(22) Filed: Jul. 23, 2003

(30) Foreign Application Priority Data

Aug. 30, 2002 (DE) .......................................... 102 40 065

(51) Int. Cl.[7] .............................................. C07C 45/00
(52) U.S. Cl. ....................... 568/324; 568/327; 568/337; 568/424; 568/600
(58) Field of Search ................................ 568/324, 327, 568/337; 426/424, 600

(56) References Cited

U.S. PATENT DOCUMENTS

| | | | | |
|---|---|---|---|---|
| 3,794,744 A | * | 2/1974 | Gardner | .................... 426/424 |
| 3,875,316 A | * | 4/1975 | Humphrey | ................... 426/349 |
| 4,490,405 A | * | 12/1984 | von Horst et al. | .......... 426/600 |
| 5,011,594 A | * | 4/1991 | Haeffner et al. | ............ 208/320 |
| 5,679,716 A | * | 10/1997 | Tobe et al. | .................. 514/685 |

FOREIGN PATENT DOCUMENTS

DE      23 50 633 A1     10/1973

* cited by examiner

*Primary Examiner*—Johann Richter
*Assistant Examiner*—Sikarl A. Witherspoon
(74) *Attorney, Agent, or Firm*—Sughrue Mion, PLLC

(57) ABSTRACT

A process is specified by which the xanthohumol present in hops can be isolated in high yield in an economical manner. In the process an ethanol pure resin extract is first extracted with a liquid or supercritical solvent in which the xanthohumol is insoluble and the resultant extraction residue is first washed with a first solvent mixture and then the extraction residue which has been washed with the first solvent mixture is, after removing the first solvent mixture, extracted with a second solvent mixture, the first solvent mixture having a higher polarity than the second solvent mixture. The hop extract produced from the second solvent mixture has a xanthohumol content of at least 85% by weight.

21 Claims, No Drawings

PROCESS FOR PRODUCING XANTHOHUMOL PRESENT IN HOPS AND XANTHOHUMOL-RICH HOP EXTRACT OBTAINABLE THEREBY

DESCRIPTION

The invention relates to a process for producing xanthohumol from hops and to a hop extract which is obtainable using the inventive process and which comprises xanthohumol at high concentration.

Xanthohumol is a yellow pigment whose structure is derived from the basic framework of chalcone and is one of the flavonoids occurring in natural hops (Humulus lupulus). Most recently, xanthohumol has attracted attention, since it is said to have pharmaceutical effects according to scientific results. For example, according to U.S. Pat. No. 5,679,716, it can be used in pharmaceutical compositions for treating osteoporosis. In addition, xanthohumol is said to have an anticarcinogenic activity. Free radicals participate in the formation of cancer cells and therefore, the possible anticarcinogenic activity of xanthohumol may be due to its property as acting as a free-radical trap.

Hops comprising xanthohumol in an amount of up to 1% by weight are known to be used principally in brewing beer. In order to be able to utilize the hop constituents, for example the bitter substances, effectively in the brewing process, hops are usually used not in their natural form, but, besides, extracts are also prepared from dried and comminuted or ground hops. Hop extracts for brewing are predominantly produced by extraction with supercritical carbon dioxide ($CO_2$) or ethanol. However, xanthohumol can only be extracted in traces with $CO_2$ and, in addition, is only very slightly soluble in hot water.

When hops are extracted with pure ethanol or ethanol/water mixtures of a high ethanol content of, for example, 90% by weight of ethanol or more, virtually all relevant hop constituents including xanthohumol can be extracted virtually completely. A corresponding extraction process is described, for example, in EP-B1-0 057 435. Similarly, the hop constituents can also be extracted with methanol.

After removing the solvent (ethanol or ethanol/water mixture or methanol), a crude extract is obtained. A crude extract which has been obtained using an ethanol/water mixture undergoes, on standing, owing to the water and, at the same time water-insoluble substances present in the crude extract, phase separation into a polar fraction and a non-polar fraction containing the xanthohumol. The phase separation can be accelerated and/or completed by centrifuging the crude extract, for example. The non-polar fraction containing the xanthohumol which is obtained after phase separation is termed ethanol pure resin extract and has a viscous pasty consistency. Approximately 80% of the constituents may be extracted from this ethanol pure resin extract by extraction with a suitable solvent. A process for extracting ethanol pure resin extract from hops using supercritical $CO_2$ is described, for example, in EP-A1-0 320 813. However, the process described has the disadvantage that the packed columns used in the continuous extraction with supercritical $CO_2$ become plugged because of the viscous consistency of the ethanol pure resin extract. The xanthohumol remains virtually completely in the $CO_2$ extraction residue here, since, as mentioned above, it may only be extracted in traces with $CO_2$. To date, no process has been disclosed by which the xanthohumol can be produced economically from the $CO_2$ extraction residue.

Another process for producing xanthohumol has been disclosed by DE-A1-199 39 350. In this process, a hop product such as hop cones, hop strobiles, or hop glands or hops which have previously been pre-extracted by supercritical carbon dioxide is used as starting material. The hops or the pre-extracted spent hops are extracted using an organic solvent or alkaline water. If appropriate, a pre-extraction with water can be carried out, the hydrophilic accompanying substances, such as mineral salts, water-soluble polyphenols or sugars, being removed from the hops. The extract obtained with the organic solvent has a xanthohumol content of 2% to 20%, based on the total amount of the extraction dry matter. In the exemplary embodiment in DE-A1-199 39 350 a xanthohumol content of 5% to 10% is reported, based on the dry matter.

It is therefore an object of the present invention to specify a process by which, in a simple and economic manner, xanthohumol can be produced from hops in high yield and high purity. It is a further object of the present invention to provide a hop extract which contains xanthohumol at high concentration.

These objects are achieved by the items characterized in the claims.

The finding which underlies the present invention is that the xanthohumol present in the ethanol pure resin extract produced from hops may be produced simply and in high yield and high purity by first extracting the ethanol pure resin extract with a liquid or supercritical solvent in which the xanthohumol is insoluble or virtually insoluble, then washing the extraction residue with a first solvent mixture which contains at least one organic solvent and water, and finally extracting the washed extraction residue, after removing the first solvent mixture, with a second solvent mixture which is likewise a mixture of at least one organic solvent and water, the first solvent mixture having a higher polarity than the second solvent mixture.

The liquid or supercritical solvent in which the xanthohumol is insoluble or is soluble only in negligible amounts and which is used for extracting the ethanol pure resin extract before extraction with the first solvent mixture and the second solvent mixture is not particularly restricted. Preferably, the liquid or supercritical solvent is selected from the group consisting of alkanes having 1 to 6 carbon atoms, petroleum ether and carbon dioxide ($CO_2$). Mixtures of these solvents can also be used. Among these solvents, $CO_2$ is preferred.

By means of this procedure, the xanthohumol can be produced at a purity of at least 85% by weight, based on the dry weight of the hop extract obtained using the inventive process, in a single extraction cycle, comprising extracting the $CO_2$ extraction residue with a first solvent mixture as described above and then using a second solvent mixture as described above, that is to say the hop extract obtainable using the inventive process has a xanthohumol content of at least 85% by weight, without the extract needing to be further treated by subsequent steps, for example concentration.

Because of the pasty and viscous consistency of the ethanol pure resin extract, it is advantageous to mix the ethanol pure resin extract, before the extraction with the liquid or supercritical solvent in which the xanthohumol does not dissolve, for example supercritical $CO_2$, with a particulate material which serves as carrier and which produces a free-flowing product which can be handled without problems in the further treatment. As particulate carrier material, any material can be used provided that it does not exert a deleterious effect on the further process. Thus the particulate carrier material should, for example, be inert towards the ethanol pure resin extract and the solvents or solvent mixtures used. Examples of an organic particulate carrier material which can be used are maltodextrins and, as inorganic particulate carrier materials, for example, silica gels, particulate silicas, kieselguhr and magnesium silicate gels, such as Florisil® are suitable. In view of the use of organic solvents, in particular inorganic or mineral carrier materials are suitable. A particulate carrier material which has proved particularly advantageous in the inventive process is kieselguhr.

With respect to the extraction to be carried out, it is advantageous to prepare a mixture of the particulate carrier material and the ethanol pure resin extract in such a manner as to produce a free-flowing product which can be introduced without problems into a vessel used for the extraction with, for example, supercritical $CO_2$, for example a pressure vessel. Application to a particulate carrier has, in addition, the advantage that the enlarged surface area makes efficient extraction of the target substances possible.

In the context of the present invention it has been found that a mixture of kieselguhr and ethanol pure resin extract in a weight ratio of about 1:1 is particularly highly suitable for the extraction.

In the case of a starting mixture of ethanol pure resin extract and particulate carrier in a weight ratio of about 1:1, extraction with supercritical $CO_2$, for example, results in a residue up to about 80% by weight of which consists of carrier material (for example kieselguhr) and about 20% by weight of hop constituents which are not extracted by $CO_2$. Xanthohumol is present in this residue up to about 2% by weight, based on the total amount of the hop constituents present in the residue.

From this extraction residue remaining on the particulate carrier after the extraction with a liquid or supercritical solvent in which the xanthohumol does not dissolve ("residue" hereinafter), the xanthohumol may be produced according to the invention in a simple manner at high concentration or purity.

For this the free-flowing residue is brought into a suitable vessel, for example into a column having intake and outlet. The residue is then washed, first by passing a first solvent mixture through the vessel (for example the column), to remove polar impurities and accompanying substances. For this a mixture of water and an organic solvent is used, a plurality of organic solvents also being able to be mixed with the water. However, preferably, only one organic solvent is used in addition to the water. The first solvent mixture must have a polarity high enough so that in the ideal case only unwanted substances are removed from the residue, but not the xanthohumol. The suitable polarity can be set by the mixing ratio of water to the organic solvent or organic solvents and varied to the point until control measurements show that traces of xanthohumol are already also being washed out. By means of this washing operation, the purity of the xanthohumol finally obtained, or the hop extract containing the xanthohumol finally obtained, increases. The washing process is preferably ended as soon as no substances to be removed can any longer be detected in the first solvent mixture leaving the vessel or the column.

The organic solvent or solvents which can be used for the first solvent mixture are those which are miscible with water, and preferably those which can be mixed with water in any ratio. Those which are suitable in particular are alcohols, such as methanol, ethanol, isopropyl alcohol, n-propyl alcohol, or butyl alcohols and ketones, such as acetone and also carboxylic esters, such as ethyl acetate. Preferably, methanol and ethanol are used, with methanol being most preferred.

It has been found that a first solvent mixture which comprises the organic solvent (in particular methanol) and water in a volumetric ratio of 2 to 3 is most suitable for removing the unwanted substances, in which case the xanthohumol remains completely in the residue.

In the context of the present invention it has surprisingly been found that the xanthohumol remaining in the washed residue can be recovered in high yield and high purity in a single subsequent step by eluting the washed residue with a second solvent mixture which is likewise a mixture that comprises one or more organic solvents and water. In principle, organic solvents which can be used are the same as those that can be used in the first solvent mixture, so that the remarks made regarding the first solvent mixture also apply to the second solvent mixture. The essential difference, however, is that the polarity of the second solvent mixture must be lower than that of the first solvent mixture. The polarity of the second solvent mixture can be reduced by using less polar organic solvents in the second solvent mixture at an otherwise identical mixing ratio with water, as in the first solvent mixture. However, preferably, the polarity of the second solvent mixture is reduced compared with the first solvent mixture by shifting the ratio of the organic solvent(s) to water. Accordingly, when the same components are used in the first and second solvent mixtures, the proportion of water in the second solvent mixture is decreased compared with the first solvent mixture. The best results have been achieved in the inventive process using a second solvent mixture which comprises the inorganic solvent (in particular methanol) and water in a volumetric ratio of 2 to 1.

It has in addition been found that it is advantageous to use, in the first and second solvent mixtures, in addition to water, in each case one and the same organic solvent, methanol being the preferred organic solvent.

The xanthohumol eluted using the second solvent mixture from the washed residue is recovered from the eluted solution in a manner known per se, for example by precipitation. Surprisingly, it has been found that the xanthohumol can be obtained as soon as after a single extraction cycle in a purity of at least 85% by weight, based on the dry weight of the resultant hop extract.

The xanthohumol, or the hop extract comprising the xanthohumol in an amount of at least 85% by weight, obtained by the inventive process is already of such a high purity that the xanthohumol can be further purified directly by recrystallization in order to decrease the content of impurities and unwanted accompanying substances still further. In this manner, it is possible to obtain pure xanthohumol, that is to say xanthohumol having a purity of virtually 100% which only contains unavoidable traces of impurity. Because of its very high concentration of xanthohumol, the hop extract, however, can also be used directly for further applications, for example in the preparation of pharmaceutical compositions or else in brewing.

In principally the same manner, in which the xanthohumol can be produced according to the invention in an economical manner in high purity from hops, other hop constituents can also be produced using the inventive principle with appropriate changes with respect to the solvent mixtures etc. used.

The example below explains the present invention.

EXAMPLE a) 5.7 kg of ethanol pure resin extract (obtained from hops of cultivar Hallertauer Taurus, 1999 harvest) are mixed homogeneously with 6.0 kg of kieselguhr (United Minerals FW 50, flux-calcined, coarse). This mixture is extracted with supercritical carbon dioxide (50° C., 280 bar), which results in 4.2 kg of $CO_2$ extract and 7.3 kg of extraction residue. Analytical data:

|  | Starting product: mixture ethanol pure resin extract with kieselguhr (% by weight) | Resultant carbon dioxide extract (% by weight) | Resultant extraction residue (% by weight) |
| --- | --- | --- | --- |
| Alpha-acids | 17.3%* | 48.6%+ | 0.1%x |
| Iso-alpha-acids | 0.6%* | <0.1%+ | 0.8%x |
| Beta-acids | 7.0%* | 19.2%+ | 0.1%x |
| Xanthohumol | 1.0%* | <0.1%+ | 1.5%x |

*based on the weight of the mixture of ethanol pure resin extract and kieselguhr
+based on the weight of the resultant carbon dioxide extract
xbased on the weight of the resultant extraction residue b) 100 g of the resultant extraction residue (up to about 80% of which consists of kieselguhr) are broken up in a mortar, charged into a vacuum-filtration funnel (pore size No. 3) and fractionated using a vacuum-filtration flask under reduced pressure (25 mbar) using the following solvent mixtures:

1st solvent mixture: 500 ml of methanol (pure)/water (demineralized) in a ratio of 2/3 (v/v)

2nd solvent mixture: 600 ml of methanol (pure)/water (demineralized) in a ratio of 2/1 (v/v)

The first solvent mixture elutes, in the first fraction, only unwanted accompanying components, xanthohumol remaining bound to kieselguhr. The second solvent mixture elutes xanthohumol in a second fraction; chlorophyll and other unwanted accompanying substances remain bound to kieselguhr. After adding 100 ml of water to the second fraction, xanthohumol precipitates out. After filtering off the solvent via a vacuum filtration funnel (pore size No. 3) and freeze-drying the orange-yellow solid, 1.26 g of product are obtained having a xanthohumol content of 87.3% by weight. Of this 0.7 g is recrystallized using methanol/water. This produces 0.5 g of orange needle-shaped crystals (purity: 99.3% xanthohumol).

What is claimed is:

1. A process for producing xanthohumol present in hops comprising the steps:
   a) preparing an ethanol pure resin extract from hops, milled hops or hop powder;
   b) extracting the ethanol pure resin extract with a liquid or supercritical solvent in which the xanthohumol is insoluble;
   c) washing with a first solvent mixture the extraction residue obtained after the extraction with the liquid or supercritical solvent and separating off the first solvent mixture and substances dissolved therein;
   d) extracting with a second solvent mixture the xanthohumol from the extraction residue washed with the first solvent mixture, the first solvent mixture being more polar than the second solvent mixture; and
   e) producing from the extracted solution the extract containing the xanthohumol in high purity.

2. The process according to claim 1, wherein the ethanol pure resin extract obtained in step a), to obtain a free-flowing material, is mixed with a particulate carrier before the extraction with the liquid or supercritical solvent in which the xanthohumol is insoluble.

3. The process according to claim 1, wherein the liquid or supercritical solvent in which the xanthohumol is insoluble is selected from the group consisting of alkanes having 1 to 6 carbon atoms, petroleum ether and carbon dioxide.

4. The process according to claim 2, wherein the particulate carrier is an organic or mineral carrier selected from the group consisting of maltodextrins, silica gels, particulate silicas, kieselguhr and magnesium silicate gels.

5. The process according to claim 2, wherein the carrier is kieselguhr.

6. The process according to claim 2, wherein the ethanol pure resin extract obtained in step a) is mixed with the particulate carrier in a weight ratio of about 1:1.

7. The process according to claim 1, wherein the ethanol pure resin extract is extracted as under step b) with supercritical $CO_2$.

8. The process according to claim 1, wherein the first solvent mixture is a mixture of at least one organic solvent and water.

9. The process according to claim 8, wherein the at least one organic solvent of the first solvent mixture is miscible with water in any ratio.

10. The process according to claim 9, wherein the at least one organic solvent of the first solvent mixture is selected from the group consisting of alcohols, ketones and carboxylic esters.

11. The process according to claim 10, wherein the at least one organic solvent of the first solvent mixture is methanol and/or ethanol.

12. The process according to claim 10, wherein the at least one organic solvent of the first solvent mixture is methanol.

13. The process according to claim 9, wherein the weight ratio of the at least one organic solvent to water in the first solvent mixture is 2:3.

14. The process according to claim 1, wherein the second solvent mixture is a mixture of at least one organic solvent and water.

15. The process according to claim 14, wherein the at least one organic solvent of the second solvent mixture is miscible with water in any ratio.

16. The process according to claim 15, wherein the at least one organic solvent of the second solvent mixture is selected from the group consisting of alcohols, ketones and carboxylic esters.

17. The process according to claim 16, wherein the at least one organic solvent of the second solvent mixture is methanol and/or ethanol.

18. The process according to claim 16, wherein the at least one organic solvent of the second solvent mixture is methanol.

19. The process according to claim 15, wherein the weight ratio of the at least one organic solvent to water in the second solvent mixture is 2:1.

20. The process according to claim 1, wherein the organic solvent of the first solvent mixture and also the organic solvent of the second solvent mixture are both methanol and the ratio of methanol to water in the first solvent mixture is 2:3 and in the second solvent mixture is 2:1.

21. The process according to claim 1, wherein the hop extract obtained in step e) contains xanthohumol at a concentration of at least 85 percent by weight, based on the dry weight of the resultant hop extract.

* * * * *